United States Patent
Culca

(10) Patent No.: US 7,257,656 B1
(45) Date of Patent: Aug. 14, 2007

(54) DEVICE FOR SYNCHRONOUS TRANSMISSION OF DATA BETWEEN A MASTER DEVICE AND A SLAVE DEVICE

(75) Inventor: Horea-Stefan Culca, Lohmar (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 10/070,032

(22) PCT Filed: Mar. 1, 2000

(86) PCT No.: PCT/EP00/01745

§ 371 (c)(1),
(2), (4) Date: May 28, 2002

(87) PCT Pub. No.: WO00/64125

PCT Pub. Date: Oct. 26, 2000

(30) Foreign Application Priority Data

Apr. 19, 1999  (DE) ................... 199 17 576

(51) Int. Cl.
G06F 13/42 (2006.01)
G06F 15/16 (2006.01)

(52) U.S. Cl. ....................... 710/106; 709/208

(58) Field of Classification Search ........ 375/219, 375/220, 356; 455/73, 76; 709/208, 209; 710/106

See application file for complete search history.

(56) References Cited

U.S. PATENT DOCUMENTS

| | | | |
|---|---|---|---|
| 4,282,489 A | 8/1981 | DeRienzo | 328/206 |
| 4,308,579 A | 12/1981 | Dlugos | 364/200 |
| 4,980,577 A | 12/1990 | Baxter | 307/272 |
| 5,056,113 A | 10/1991 | Takai | 375/58 |
| 5,336,947 A | 8/1994 | Lehning | 307/360 |
| 5,343,503 A | 8/1994 | Goodrich | 375/121 |
| 5,528,215 A * | 6/1996 | Siu et al. | 340/286.01 |
| 5,566,320 A | 10/1996 | Hubert | 395/474 |
| 5,584,033 A * | 12/1996 | Barrett et al. | 710/105 |

(Continued)

FOREIGN PATENT DOCUMENTS

DE     3937807     5/1990

(Continued)

OTHER PUBLICATIONS

TIA Standard, "Interface Between Data Terminal Equipment and Data Circuit-Terminating Equipment Employing Serial Binary Data Interchange", TIA-232-F, Oct. 1997, Telecommunications Industry Association (52 pages).

*Primary Examiner*—David C. Payne
*Assistant Examiner*—Aslan Ettehadieh
(74) *Attorney, Agent, or Firm*—Darby & Darby

(57) ABSTRACT

A data transmission device for serial, synchronous transmission of data includes a master device and a slave device which can be linked by at least one data transmission line and a clock signal line. The master and slave devices can be linked by an additional ready signal line for transmitting a ready signal from the slave device to the master device. When the slave device has completed a data reading operation, a ready signal can be generated for the master device. The master device is able to initiate a further writing operation to the slave device only after receiving the ready signal from the slave device. Suppression of interference by the slave device may be enhanced.

3 Claims, 2 Drawing Sheets

U.S. PATENT DOCUMENTS

| | | | |
|---|---|---|---|
| 6,032,178 A * | 2/2000 | Bacigalupo et al. | 709/208 |
| 6,058,443 A * | 5/2000 | Gulick | 710/312 |
| 6,178,206 B1 * | 1/2001 | Kelly et al. | 375/257 |
| 6,247,082 B1 * | 6/2001 | Lo et al. | 710/105 |
| 6,912,210 B1 * | 6/2005 | Uchiba et al. | 370/300 |
| 2001/0031026 A1 * | 10/2001 | Kohl et al. | 375/354 |

FOREIGN PATENT DOCUMENTS

| | | |
|---|---|---|
| EP | 0415551 | 3/1991 |
| EP | 0588191 | 3/1994 |
| EP | 0693729 | 7/1995 |
| EP | 0769748 | 4/1997 |
| JP | 6369350 | 3/1988 |
| JP | 63061533 | 3/1988 |
| JP | 6243052 | 9/1994 |

\* cited by examiner

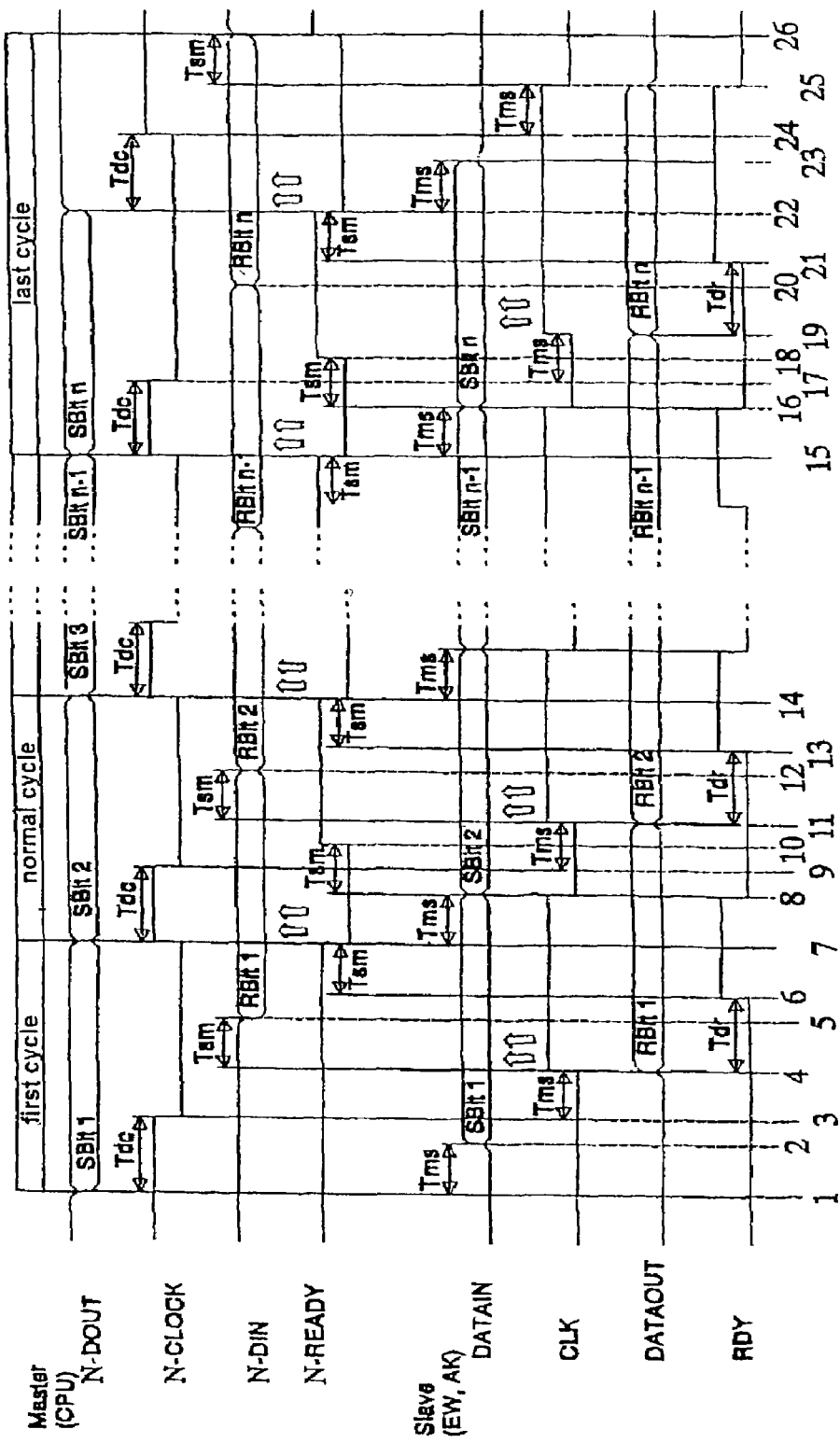

DEVICE FOR SYNCHRONOUS TRANSMISSION OF DATA BETWEEN A MASTER DEVICE AND A SLAVE DEVICE

BACKGROUND

The present invention relates to a data transmission device having a master device and a slave device connected via at least one data transmission line and one clock signal line.

Data transmission devices of the type mentioned at the outset are used today in many electrical devices. The data exchange, for instance, between different electrical switching devices gains more and more importance.

Information on programs and functions to be executed and on the devices themselves or on current device states are to be interrogatable at any time by any device at any place, and to be exchangeable among the devices. To this end, the devices are equipped down to the lowest functional levels with intelligence and corresponding device interfaces for the data exchange.

In the low-cost area, it is preferred to use serial data transmission types. This has the advantage that fewer signal lines are needed than in the case of a parallel data transmission. To keep the outlay of required hardware as low as possible, the data transmission should be implemented synchronously.

A serial synchronous data transmission between two stations requires at least one data line for bidirectional data transmission and one clock signal line or two data lines for unidirectional data transmission and one clock signal line. The clock signal line, which controls the entire signal flow between the stations, is of particular importance here. This clock signal is generated by a master device. A slave device which communicates with the master device has to adapt itself to this predetermined clock.

Known interfaces for these serial synchronous transmission types include: I²C (Philips), SPI (Motorola), Microwire (National Semiconductor), or the like. These interfaces are generally used for the data transmission between different components within one device.

If the intention is to implement such a serial synchronous data transmission between individual devices, measures have to be taken with respect to possibly occurring interference signals. To protect, in particular, the clock signal line from interference effects, provision is usually made for hardware interference suppression measures in the form of filters and screenings. In some cases, the interference immunity is supported by additional software interference suppression measures. Such software interference suppression measures are generally implemented via a repeated reading of the received information. To this end, the information is repeatedly read at intervals of about 5 to 20 µs (average duration of the interference effects) and evaluated via a majority decision (signals which are read in the majority of cases are rated as correct). To increase the interference immunity in this kind of interference suppression, the number of read operations is increased.

Interference suppression via hardware involves the disadvantage of a relatively large expenditure for hardware. Furthermore, digital software interference suppression is insufficient since only the master device which, in fact, generates the clock signal, is able to perform repeated read operations by delaying or halting the clock signal for the required (check) read time.

SUMMARY OF THE INVENTION

Therefore, an object of the present invention is to provide a data transmission device which, in a simple way, offers increased interference immunity in a serial data transmission.

The present invention provides a data transmission device for serial synchronous data transmission. The data transmission device includes a master device including a first arithmetic unit and a master interface and a slave device including a second arithmetic unit and a slave interface. The master and slave interfaces are capable of being connected via at least one data transmission line and a clock signal line, and are capable of being connected via a acknowledgment signal line configured for a transmission of an acknowledgment signal from the slave device to the master device. The second arithmetic unit is capable of generating the acknowledgment signal upon completion of a data reading operation. The first arithmetic unit is configured so that the master device is capable of initiating a further write operation to the slave device only upon receiving the acknowledgment signal from the slave device.

According to the present invention, the additional acknowledgment line enables the slave device to inform the master device of the receipt of the transmitted data and that the processing of the data as well as the corresponding interference suppression measure have been completed. The master device will not initiate any new operation in which this slave is involved until it has received the acknowledgment signal from the slave device. Due to this embodiment according to the present invention, the slave device has also the possibility to eliminate interference from received signals during an adequate period of time.

BRIEF DESCRIPTION OF THE DRAWINGS

Further details and advantages of the present invention will become apparent in the following description based on an exemplary embodiment, with reference to the drawings.

FIG. 2 shows a transmission protocol for the serial synchronous data transmission between two stations according to FIG. 1.

DETAILED DESCRIPTION

Figure 1:
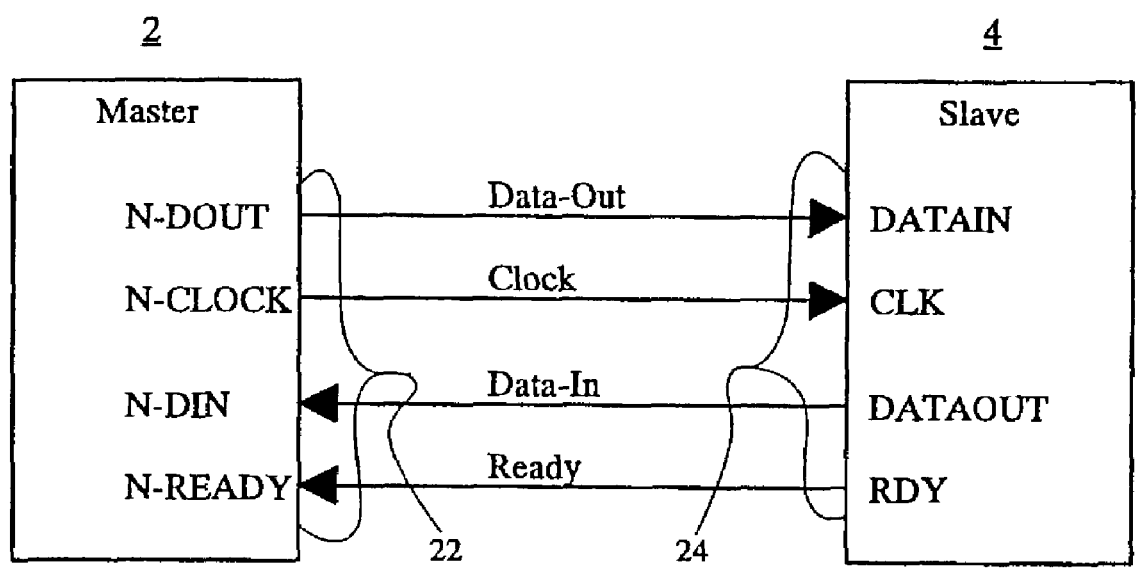
FIG. 1 is a schematic representation of a data transmission device according to the present invention, including a master device and a slave device.

FIG. 1 shows a device arrangement composed of a master device 2 and a slave device 4 which are interconnected via their data transmission interfaces, master interface 22 and slave interface 24, for the purpose of data exchange. For the purpose of communication, both devices possess an intelligence in the form of a separate arithmetic unit (for example, a microprocessor or a controller).

In a preferred embodiment, there exist at least one data transmission line (Data-Out) for transmitting data from the master to the slave device 2, 4, one data transmission line (Data-In) for transmitting data from the slave to the master device 4, 2, one clock signal line (Clock), and one acknowledgment line (Ready) according to the present invention for transmitting an acknowledgment signal from the slave to the master device 4, 2. The interfaces of the master and slave devices 2, 4 have corresponding terminal contacts, the signal inputs of master device 2 preferably being inverted in the exemplary embodiment shown. If only one data transmission line or only one data transmission connection exists for each station, this data transmission line or connection must be suitable for bidirectional operation. In the exemplary embodiment shown, two data transmission lines (Data-Out, Data-In) exist. These are data transmission lines for a unidirectional operation; thus, an unwanted superimposition of data during simultaneous transmission of data of the two stations can be ruled out. By the implementation of an acknowledgment signal line (Ready) according to the present invention, slave device 4 is now able to inform master device 2 that the processing of received data and the checking thereof (via an interference suppression measure such as repeated reading and subsequent majority decision) is completed and slave device 4 is now ready to receive further data. Consequently, master device 2 will not initiate any new operation (in which active slave device 4 would be involved) until it receives the acknowledgment via the ready signal from slave device 4. In this manner, slave device 4 is also able to eliminate interference from signals over an adequate period of time.

In the following, the transmission protocol for the serial synchronous communication between master and slave devices 2, 4 will be explained with reference to FIG. 2.

In the following description and in FIG. 2, the signals will be denoted by the respective terminal designations of the interfaces of the master and slave devices. In the exemplary embodiment represented and described, the signals N-DOUT, N-CLOCK, N-DIN, N-READY of the master are inverted signals (active low).

| Instant | Master | Slave |
|---|---|---|
| 1 | initiates the communication (the first cycle) by placing the first transmit bit (SBit 1) on the N-DOUT line | |
| 2 | | receives SBit 1 as DATAIN after the corresponding master-slave transmission delay Tms |
| 3 | activates the N-CLOCK after the required clock delay Tdc | |
| 4 | | after the transmission time Tms, the slaves receives an interrupt from the CLK line. Thereupon, it takes the following measures: a) places the first receive bit (RBit 1) on DATAOUT b) reads SBit1 from line DATAIN with interference suppression (repeated reading and comparing). If necessary, the interference suppression is carried out longer which can result in an extension of the Tdr delay. |
| 5 | receives RBit 1 after the slave-maser transmission delay Tsm | |
| 6 | | activates the RDY line after the required Tdr delay |
| 7 | receives the N-READY signal after the transmission delay Tsm, and: a) deactivates the N-CLOCK signal b) places the next S-Bit on N-DOUT (initiates a new cycle) c) reads RBit1 from line N-DIN with interference suppression (repeated reading and comparing. If necessary, the interference suppression is carried out longer which can result in an extension of the Tdc delay. | |
| 8 | | receives S-Bit 2 as DATAIN after the corresponding master-slave transmission delay Tms and deactivates the CLK signal; consequently deactivates RDY as well |
| 9 | activates the N-CLOCK signal after the required clock delay Tdc (can be extended due to interference-suppressed reading) | |
| 10 | N-READY becomes inactive after the transmission delay Tsm | |
| 11 | | receives the activated CLK signal after the transmission delay Tms, and: a) places the next R-Bit on DATAOUT b) reads the S-Bit from line DATAIN with interference suppression (repeated reading and comparing). If necessary, the interference suppression is carried out longer which can result in an extension of the Tdr delay. |
| 12 | after the transmission delay Tsm, the RBit arrives | |
| 13 | | activates RDY after the required Ready delay Tdr (can be extended due to interference-suppressed reading) |
| 14 | receives the N-READY signal after the transmission delay Tsm, and: a) deactivates the N-CLOCK signal b) places the next SBit on N-DOUT (initiates the next cycle) c) reads with interference suppression . . . | |
| . . . | steps 7-13 are repeated until the penultimate cycle | in this manner, bits 2 . . . n-1 are transmitted |
| 15 | initiates the last cycle by placing the last transmit bit (SBit n) on the N-DOUT line. Deactivates N-CLOCK and reads the RiBit n-1 with interference suppression | |
| 16 | | receives S-Bit n on DATAIN and the deactivated CLK signal after the corresponding master-slave transmission delay Tms; consequently, deactivates RDY as well |
| 17 | activates N-CLOCK after the required clock delay Tdc (can be extended due to interference-suppressed reading) | |
| 18 | N-READY becomes inactive after the transmission delay Tsm | |
| 19 | | receives the activated CLK signal after the transmission delay Tms, and: a) places the last RBit n on DATAOUT b) reads the last S-Bit n from line DATAIN with interference suppression (repeated reading and comparing). If necessary, the interference suppression is carried out longer which can result in an extension of the Tdr delay. |

-continued

| Instant | Master | Slave |
|---|---|---|
| 20 | receives the RBit n after the transmission delay Tsm | |
| 21 | | activates RDY after the required Ready delay Tdr (can be extended due to interference-suppressed reading) |
| 22 | receives the N-READY signal after the transmission delay Tsm, and: a) sets line N-DOUT to the resting level ('high') c) reads R-Bit1 from line N-DIN with interference suppression (repeated reading and comparing). If necessary, the interference suppression is carried out longer which can result in an extension of the Tdc delay (!N-CLOCK is not yet deactivated) | |
| 23 | | after the transmission delay Tms, line DATAIN becomes inactive ('low') |
| 24 | After RBIT n is read, CLOCK is deactivated; consequently, the slave is informed of the completion of the RBIT n read operation; in this case, Tdc covers only the interference-suppressed reading and can therefore be shorter than at other times | |
| 25 | | After the transmission delay Tms, CLK becomes inactive; consequently, RDY is deactivated and line DATAOUT is set free ('low') |
| 26 | after the transmission delay Tsm, N-READY becomes inactive and N-DN becomes free ('high'). The master can now start the transmission of a new message. | |

Tdc: clock delay at the master device
Tdr: delay of the acknowledgment signal "RDY" at the slave device
Tms: delay of the signals during the transmission from the master to the slave device
Tsm: delay of the signals during the transmission from the slave to the master device The present invention is not limited to the specific embodiments described above but is intended to be limited only by the scope of the claims appended hereto. The present invention further includes a slave device 4 which features a slave interface 24 having an acknowledgment terminal (RDY) and which contains an arithmetic unit (microprocessor or controller) which is designed in such a manner that an acknowledgment signal for master device 2 can be generated at the acknowledgment terminal (RDY) of slave interface 24 upon completion of a data reading operation. The present invention moreover includes a master device 2 which features a master interface 22 having an acknowledgment terminal (N-READY) and which includes an arithmetic unit which is designed in such a manner that a further write operation to slave device 4 can be initiated upon receipt of an acknowledgment signal from slave device 4.

What is claimed is:

1. A method for serial synchronous data transmission in a data transmission device including a master device and a slave device, the master device including a first arithmetic unit and a master interface, the slave device including a second arithmetic unit and a slave interface, the master and slave interfaces being connected via a first and a second unidirectional data transmission line, an acknowledgment signal line, and a clock signal line, the method comprising:
   initiating, using the master device, a communication by transmitting a first transmit bit;
   receiving, using the slave device, the first transmit bit after a first master-slave transmission delay;
   activating, using the master device, the clock signal after a first clock signal delay time;
   receiving, using the slave device, an interrupt signal from the clock signal line after a second master-slave transmission delay;
   transmitting, using the slave device, a first receive bit;
   reading, using the slave device, the first transmit bit while applying a first interference suppression measure;
   receiving, using the master device, the first receive bit after a first slave-master transmission delay;
   activating, using the slave device, a first acknowledgment signal after a first delay time;
   receiving, using the master device, the first acknowledgment signal after a second slave-master transmission delay;
   deactivating, using the master device, the clock signal;
   initiating, using the master device, a new cycle by transmitting a second transmit bit;
   reading, using the master device, the first receive bit while applying a second interference suppression measure;
   receiving, using the slave device, the second transmit bit and a first deactivated clock signal after a third master-slave transmission delay;
   activating, using the master device, the clock signal after a second clock signal delay time;
   deactivating, using the master device, the first acknowledgment signal after a third slave-master transmission delay;
   receiving, using the slave device, a first active clock signal after a fourth master-slave transmission delay;
   transmitting, using the slave device, a second receive bit;
   reading, using the slave device, the second transmit bit while applying a third interference suppression measure;
   receiving, using the master device, the second receive bit after a fourth slave-master transmission delay;
   activating, using the slave device, a second acknowledgment signal after a second delay time;
   receiving, using the master device, the second acknowledgment signal after a fifth slave-master transmission delay;
   deactivating, using the master device, the clock signal;
   transmitting, using the master device, a third transmit bit;
   reading, using the master device, the second receive bit while applying a fourth interference suppression measure;
   initiating, using the master device, a last cycle by:
      transmitting a last transmit bit;
      deactivating the clock signal; and
      reading a receive bit of a previous cycle while applying a fifth interference suppression measure;
   receiving, using the slave device, a last transmit bit and a second deactivated clock signal after a fourth master-slave transmission delay;
   activating, using the master device, the clock signal after a third clock signal delay time;
   deactivating, using the master device, a third acknowledgment signal after a sixth slave-master transmission delay;

receiving, using the slave device, a second active clock signal after a fifth master-slave transmission delay;

transmitting, using the slave device, a last receive bit;

reading, using the slave device, the last transmit bit while applying a sixth interference suppression measure;

receiving, using the master device, the last receive bit after a seventh slave-master transmission delay;

activating, using the slave device, a fourth acknowledgement signal after a third delay time;

receiving, using the master device, the fourth acknowledgment signal after an eighth slave-master transmission delay;

setting, using the master device, the clock signal to an inactive resting level;

reading, using the master device, the last receive bit while applying a seventh interference suppression measure;

setting, using the slave device, the first unidirectional data transmission line inactive after a sixth master-slave transmission delay;

deactivating, using the master device, the clock signal after the reading the last receive bit;

deactivating, using the slave device, a third active clock signal after a seventh master-slave transmission delay; and deactivating, using the master device, a fifth acknowledgment signal after a ninth slave-master transmission delay.

2. The method as recited in claim 1, wherein the transmitting the first receive bit is performed by transmitting only a single bit.

3. The method as recited in claim 1, wherein the transmitting the first transmit bit is performed by transmitting only a single bit.

* * * * *